United States Patent

[11] 3,557,342

[72] Inventor William W. Chambers
 Anaheim, Calif.
[21] Appl. No. 826,775
[22] Filed May 5, 1969
[45] Patented Jan. 19, 1971
[73] Assignee Robertshaw Controls Company
 Richmond, Va.
 a corporation of Delaware
 Continuation-in-part of application Ser. No.
 637,490, May 10, 1967, now abandoned,
 which is a continuation-in-part of
 application Ser. No. 547,491, May 4, 1966,
 now abandoned.

[54] TEMPERATURE CONTROL SYSTEM
 19 Claims, 8 Drawing Figs.
[52] U.S. Cl. .................................................. 219/499
[51] Int. Cl. .................................................. H05b 1/02

[50] Field of Search............................................ 219/477,
 480, 494, 499, 501; 165/22, 26

[56] References Cited
 UNITED STATES PATENTS
 3,215,818 11/1965 Deaton........................... 219/499
 3,240,948 3/1966 Burley........................... 219/499

*Primary Examiner*—Bernard A. Gilheany
*Assistant Examiner*—F. E. Bell
*Attorneys*—Auzville Jackson, Jr., Robert L. Marben and
 Fulwider, Patton, Rieber, Lee & Utecht

ABSTRACT: A temperature control system including a temperature sensitive bridge circuit connected to a controlled rectifier, and wherein environmental temperature changes unbalance the bridge and cause the rectifier to conduct and thereby effect operation of a furnace or an air conditioner.

PATENTED JAN 19 1971

INVENTOR.
WILLIAM W. CHAMBERS
BY Fulwider, Patton, Rieber,
Lee and Utecht
ATTORNEYS INVENTOR.
WILLIAM W. CHAMBERS
BY Fulwider, Patton, Rieber,
Lee and Utecht
ATTORNEYS

INVENTOR.
WILLIAM W. CHAMBERS 3,557,342

TEMPERATURE CONTROL SYSTEM

This is a continuation-in-part of Application Ser. No. 637,490, filed May 10, 1967 which was a continuation-in-part of Application Ser. No. 547,491, filed May 4, 1966 now abandoned.

BACKGROUND OF THE INVENTION

1. Field of the Invention

This invention relates to improvements in temperature control systems, and more particularly, to a novel temperature control circuit employing a controlled rectifier to regulate the operation of a controlled heat source which may be either a heating source or a cooling source.

2. Description of the Prior Art

Temperature control systems generally include a controlled heat source and a temperature control circuit for regulating the operation of the source. The operation of the temperature control circuit, in turn, is regulated by a sensor which monitors the temperature in the environment to be controlled by the source. When the temperature changes from a predetermined value, the sensor actuates the temperature control circuit to energize the controlled heat source. The source then operates to return the environment to the predetermined temperature.

Possibly the most common type of sensor employed in such temperature control systems is an electrical switch in which bimetallic strips make and break electrical contact. In recent years, however, dissatisfaction with the reliability, rate and accuracy of operation of such bimetallic switches has led to the development and increased use of temperature control circuits employing solid state switches regulated by temperature sensitive impedance elements such as thermistors. Such, so-called "solid state" circuits respond more rapidly and accurately to temperature changes than their predecessors employing bimetallic switches, and are extremely long lasting and relatively trouble-free.

Unfortunately, however, most presently available solid state temperature control circuits require a large number of wires between the thermostat or temperature sensing portion of the circuit, and the electrical power source and device for regulating the operation of the associated controlled heat source. The connection of the wiring takes appreciable time and the exercise of great care on the part of the workman installing the circuit. Because of this, wiring mistakes are often made, resulting in improper and sometimes dangerous operation of the temperature control system.

Another drawback of presently available solid state temperature control circuits is that undesirably high power levels are sometimes developed in the circuitry for actuating the controlled heat source, despite the fact that the source will operate in a maximum or wide open condition on much lower levels of power. Excessive power overheats and weakens the wiring and components regulating the controlled heat source and on occasion results in permanent damage to the temperature control circuit.

Solid state as well as other types of temperature control systems also have a single heating or cooling capacity. When it is desired to heat or cool a given environment, the maximum capacity is called upon to bring the environment to the desired temperature as rapidly as possible. Thereafter, however, the maximum capacity is not generally needed to maintain the temperature in the environment at or about the desired temperature. Despite this, each time the system turns on, the maximum capacity of the controlled heat source is called upon to regulate the temperature back to the desired value. This is often wasteful of fuel and electricity and commonly results in the temperature control system overshooting its desired mark by either heating to a higher temperature or cooling to a lower temperature than desired.

Similarly, it sometimes becomes desirable to heat or cool an environment to a given temperature at different rates at different times. For example, it may be desired to very rapidly heat a room or oven to a particular temperature. Under such condition the maximum capacity of the heat source is required. As this temperature is approached it may be desired to heat the room or oven more slowly to prevent overshoot. Present day temperature control systems do not generally have such capabilities or flexibility.

Some solid state temperature control systems are capable of both heating and cooling a given area. In switching between cooling and heating operations, however, such systems do not immediately begin to heat or cool the area. In fact, when switching from heating to cooling operation, the temperature must first rise a few degrees above that established by the heating operation or the system must be adjusted to call for cooling at a lower temperature. Conversely, when switching from cooling to heating operation, the temperature must drop a few degrees below that established by the cooling operation or the system must be adjusted to call for heat at a higher temperature. Accordingly, in conventional systems for both heating and cooling, there is a built-in "dead band" over which the system will not function in switching between heating and cooling operation.

SUMMARY OF THE INVENTION

The temperature control system of present invention is characterized by a temperature sensitive bridge connected to a controlled rectifier wherein environmental temperature changes unbalance the bridge and cause the rectifier to conduct and thereby effect operation of environmental temperature change apparatus.

In view of the foregoing shortcomings and limitations of presently available temperature control circuits and systems, it is an object of the present invention to provide a simplified temperature control circuit which is very easy to quickly and correctly install and which is inexpensive to manufacture and maintain.

Another object of the present invention is to provide a temperature control circuit of the foregoing character which is useful to control a heating source or a cooling source, or both.

A further object of the present invention is to provide an improved temperature control system including means for preventing damage to the circuitry, components and wiring for actuating the controlled heat source of the system, often caused by the existence of high levels of line voltage in systems of this type.

Still another object of the present invention is to provide an improved temperature control system having different heating and/or cooling capacities which will automatically heat or cool a given environment at different rates depending on the degree of heating or cooling required.

A still further object of the present invention is to provide an improved temperature control circuit for regulating heating and cooling sources either separately or automatically in combination with each other.

An additional object of the present invention is to provide high temperature limit means for shutting down the heating source if the temperature in the area of the heating source becomes dangerously high, such as may occur by reason of an inoperative fan or clogged filter.

Another object of the present invention is to provide an improved temperature control system of the foregoing character which will operate to heat or cool a given area to the same temperature when switched between heating and cooling operation, thereby eliminating the "dead band" commonly associated with systems capable of both heating and cooling operation.

The foregoing as well as other objects and advantages of the present invention may be more clearly understood by reference to the following detailed description when considered with the drawings which by way of example only illustrate particular temperature control circuits and systems embodying the features of the present invention.

DESCRIPTION OF THE PREFERRED EMBODIMENTS

Figure 1:
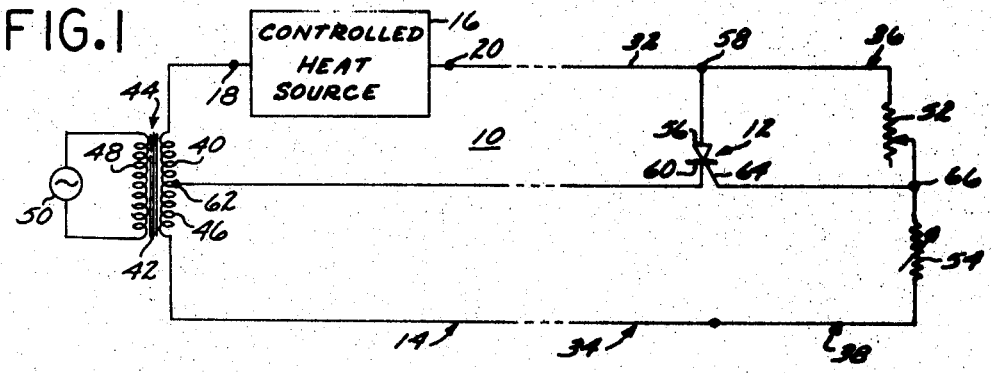
FIG. 1 is a wiring diagram of a basic form of the temperature control system.

In the drawings, the temperature control circuit of the present invention is represented generally by the numeral 10 and comprises a controlled rectifier 12 connected to an AC bridge circuit 14 including a controlled heat source 16 in one of its legs. The bridge circuit 14 is temperature sensitive and may be adjusted to balanced conditions at preselected environmental temperatures within a given temperature range. When the bridge circuit 14 is balanced, the controlled rectifier 12 is nonconductive. However, changes in the environmental temperature unbalance the bridge causing the controlled rectifier 12 to intermittantly trigger or fire. The firing of the controlled rectifier 12, in turn, energizes the controlled heat source 16 to either heat or cool the environment surrounding the bridge to rebalance the bridge circuit.

The controlled heat source 16 may be a controlled heating source or a controlled cooling source, and may be actuated by current flowing between terminals 18 and 20 connecting the source in the bridge circuit 14. For example, the controlled heat source 16 may take the form illustrated in FIG. 2 wherein the momentary interruption of current flow between the terminals 18 and 20 does not interrupt the supply of heat or cold by the source.

Figure 2:
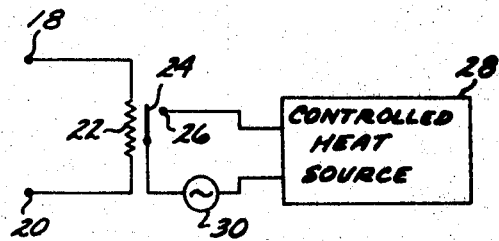
FIG. 2 is a wiring diagram of one form of controlled heat source for use in the present invention.

As illustrated in FIG. 2, the source 16 includes a heating resistor 22, of low resistance for power dissipation, connected between the terminals 18 and 20. A movable bimetallic switch arm 24 is located immediately adjacent the heating resistor 22 and is normally biased away from a contact 26, as by the magnetic field of a permanent magnet (not shown). The electrical contact 26 is connected to one input terminal of a controlled heat source 28 while the switch arm 24 is connected to an AC source 30 leading to a second input terminal to the controlled heat source.

The controlled heat source 28 may be a heating source, such as a heat motor, or a cooling source, such as a refrigeration unit, and it is energized upon a closing of the switch arm 24 against the contact 26. It may also be a direct acting valve in which case arm 24 will generally hold the valve closed when deenergized and upon energization will move to open the valve. In order to move the switch arm 24 against the contact 26, it is necessary that sufficient heat be generated in the resistor 22 to cause the arm to bend toward and against the contact. This, in turn, requires that the current flowing through the resistor 22 exceed a predetermined minimum value. Therefore, the controlled heat source 16 possesses a predetermined current threshold of operation. Once the heat threshold is attained, however, a momentary interruption of current flow through the heating resistor 22 does not halt operation of the heat source 28—assuming the duration of the interruption is insufficient to allow the resistor 22 to cool appreciably. Thus, for example, an interruption of current flow through the heating resistor 22 during alternate halves of an alternating current signal does not produce an interruption in the operation of the heat source 28, once the arm 24 has been heated to a point where the source is actuated.

In the form of the temperature control circuit 10, illustrated in FIG. 1, the source 16 is a controlled heat source. However, as will become apparent, by changing the type or location of impedance elements in the bridge circuit 14, the source 16 may be a controlled cooling source.

In FIG. 1, the bridge circuit 14 includes four legs 32, 34, 36 and 38. The leg 32 includes the controlled heat source 16 in series with one-half 40 of a center tapped secondary winding 42 of a transformer—the other half 46 of the secondary winding comprising the leg 34 of the bridge circuit 14.

The transformer 44 is preferably a voltage stepdown transformer and includes a primary winding 48 connected in series with an AC source 50 which may be a conventional 110 volt, 60 cycle source. Thus arranged, the source 50 develops equal and in-phase AC voltages across the halves 40 and 46 of the secondary winding 42. In fact, the center tapped secondary winding 42 may be considered as defining two in-phase, AC signal sources in the legs 32 and 34 of the bridge circuit.

The legs 36 and 38 of the bridge circuit 14 may take various forms and include various elements depending in part upon the type of controlled heat source 16 being employed. In the illustrated form, wherein the source 16 is a controlled heating source, the leg 36 includes a temperature selecting potentiometer 52 while the leg 38 includes a temperature sensitive variable impedance 54, preferably a thermistor having a negative temperature coefficient of impedance variation. Both the potentiometer 52 and the thermistor 54 present relatively high impedances, commonly in the order of 20,000 ohms, and are substantially equal in value to define a balanced condition for the bridge 14 at a preselected temperature. Because of the high impedance presented by the potentiometer and thermistor relative to the resistance of the controlled heat source 14 (heating resistor 22), the voltage drop across the resistance of the source due to bridge currents has no noticeable effect upon the bridge balance and substantially the entire voltages developed in the halves 40 and 46 of the secondary winding 42 appear across the potentiometer 52 and thermistor 54, respectively. Also, the alternating current flowing in the bridge circuit is a relatively small value, far from sufficient to energize the source 16. In fact, but for the controlled rectifier 12, normal unbalance of the bridge circuit 14 would not produce sufficient current to actuate the controlled heat source 16.

In the form of the temperature control circuit 10 illustrated in FIG. 1, the controlled rectifier 12 is a silicon controlled rectifier including an anode 56 connected to a junction 58 of the legs 32 and 36, a cathode 60 connected to the center tap 62 of the secondary winding 42, and a control electrode 64 connected to a junction 66 of the legs 36 and 38.

Generally speaking, the rectifier 12 is a current controlled solid state switch and is conductive only in one direction. To trigger or fire the rectifier 12, the anode 56 must be positive relative to the cathode 60, that is, the rectifier must be forwardly biased. Then a small firing or control current above a predetermined value flowing into the control electrode 64 will cause the rectifier to trigger or fire. After the controlled rectifier fires, it acts essentially as a short circuit and will pass large currents between the anode 56 and cathode 60. When the forward bias is removed and when the rectifier 12 is back-biased, that is, when the cathode is positive relative to the anode, the rectifier is nonconductive and presents an extremely high impedance. Thus, when an AC signal is applied across the anode and cathode of the controlled rectifier 12, the rectifier is primed for operation during a positive-going half-cycle and will fire when a firing current is applied to the control electrode. At the completion of the positive-going half-cycle and during the negative-going half-cycle, the controlled rectifier is nonconductive and acts much as an open circuit presenting an extremely large impedance.

As used herein, the terms positive-going and negative-going half-cycles refer to the waveforms of the AC signals developed in the halves 40 and 46 of the secondary winding 46 and not to potentials developed by the AC signals across the controlled rectifier. Incidentally, in FIG. 1, the controlled rectifier 12 is forward biased during positive-going half-cycles and reverse biased during negative-going half-cycles. As will be described hereinafter in connection with FIG. 3, however, the circuit connection for the bridge circuit may be such that the rectifier is forward biased during both positive and negative-going half-cycles.

In the temperature control circuit 10, when the bridge 14 is balanced, the voltage at the junction 66 is substantially equal to the voltage at the center tap 62 and no current flows in the control electrode 64 during either half-cycle of the alternating current developed in the secondary winding 42 of the transformer 44. Also, the voltage developed across the anode and the cathode of the rectifier 12 is insufficient to trigger the rectifier by itself. Therefore, when the bridge 14 is balanced, the rectifier 12 remains in a nonconductive state and insufficient current flows through the controlled heat source 14 to energize the source.

However, should the bridge circuit 14 be unbalanced, either by a decrease in the environmental temperature surrounding the thermistor 54, or by a manual adjustment of the potentiometer 52 to decrease its impedance, the voltage across the thermistor immediately becomes greater than the voltage across the potentiometer. Under such conditions, the voltage at the junction 66 exceeds the voltage at the center tap 62 during each positive-going half-cycle of AC current developed in the secondary winding 42. At the same time the rectifier 12 is forward biased. Therefore, as the magnitude of the positive-going AC current increases, the voltage at the junction 66 increases relative to the voltage at the center tap 62 and the current flowing in the control electrode 64 increases to a value sufficient to fire the rectifier 12.

The firing of the rectifier 12 causes the voltage across the portion 40 of the secondary winding 42 to be applied directly across the controlled heat source 16. This in turn increases the current flowing through the heating resistor 22 to energize the controlled heat source. Legs 36 and 38 of the bridge then share the balance of the 24 volt supply voltage, or 12 volts, hence power dissipated in these legs is reduced with consequent loss in self heating, This does not turn off the rectifier 12 since after rectifier firing, the control electrode 64 cannot affect rectifier operation until the end of the half cycle. Hence, bridge unbalance at this time does not impair operation.

During each negative-going half-cycle, the rectifier 12 is back biased and becomes nonconductive. As previously discussed, however, such momentary interruptions of current flow through the heating resistor 22 do not halt operation of the heat source which continues until the temperature in the environment surrounding the thermistor 54 increases to a level at which the bridge 14 is again balanced. Thereafter, the rectifier 12 is not fired during either half-cycles, the resistor 22 cools, and the source 16 is deenergized.

The foregoing operation is repeated each time the bridge circuit is unbalanced by a reduction in the environmental temperature. In this manner, the temperature control circuit 10 maintains the temperature in the surrounding environment at a value determined by the setting of the potentiometer 52.

A similar operation takes place if the potentiometer is readjusted to present a reduced impedance. In that case, the temperature control circuit 10 regulates the source 16 to adjust the temperature of the environment to a higher value corresponding to the new setting of the potentiometer 52. It is of course understood that if the temperature of the surrounding environment exceeds the temperature setting of the potentiometer 52, the bridge circuit also unbalances, but, in such a manner as not to excite either the rectifier 12 or the controlled heat source 16. Under such conditions, the temperature control circuit 10 remains inactive until the environmental temperature decreases to the setting of the potentiometer 52 or the setting of the potentiometer is changed to represent a higher temperature.

In the foregoing operations, it should be noted that the placement of the controlled heat source 16 in the leg 32 of the bridge circuit 14 causes the system to reach the desired temperature in a much shorter time than if the source were external to the bridge and in series with the rectifier 12. That is, the placement of the source 16 in the bridge circuit 14 results in a shorter heating cycle for the temperature control circuit 10.

In particular, it will be recalled that when the rectifier 12 is nonconductive, voltages developed in the halves 40 and 46 of the secondary winding 42 appear across the potentiometer 52 and the thermistor 54. When the rectifier conducts, however, current flows heavily through the controlled heat source, the rectifier 12 into the center tap 62 to actuate the controlled heat source and the voltages appearing across the potentiometer 52 and the thermistor 54 drop to substantially one-half of their original value. This means that less current flows through the thermistor 54 to substantially reduce the self-heating of the thermistor. Accordingly, the thermistor 54 further decreases in temperature and increases in impedance, tending to lock the rectifier or SCR 70 in conduction. This means that during the positive-going half-cycles immediately following the initial firing of the rectifier, the bridge circuit 14 continues to be heavily unbalanced to cause the rectifier to fire early during each positive-going half-cycle. The controlled heat source 16, therefore, rapidly switches to a state of operation to provide maximum heating for the surrounding environment to more rapidly bring the bridge circuit to a balanced condition and the environment to the desired temperature. In this manner, the placement of the controlled heat source 16 in the bridge circuit 14 causes the temperature control circuit 10 to possess a relatively short heating cycle and substantially reduces the time required for the controlled heat source to turn after the initial call for heat.

An opposite result is produced when the controlled heat source 16 is a controlled cooling source, and the positions of the thermistor 54 and potentiometer 52 are reversed. Under such conditions, the reduced self heating of the thermistor 54 results in a longer cooling cycle for the circuit 10. In particular, the loss in self heating of the thermistor looks to the system like rebalance and the SCR 12 becomes nonconducting. The result as seen by the heat source 16 is a series of short heating pulses which increase in length as unbalance increases. The amount of unbalance in the bridge to operate the cooling source is thus greater than that required for a heating type operation. Similarly, on turn-off the percent on-time gradually decreases, thus requiring more change in bridge balance to operate the cooling source than in the case of heating. The summation of the above results in a greater difference in turn-on and turn-off temperature for cooling than for heating, thus extending the overall time for a cooling operation. The relatively long turn-on time for cooling operation. The relatively long turn-on time for cooling desired since cooling equipment may be damaged short on and off cycles.

As previously indicated, the circuit arrangement for the legs 36 and 38 may take various forms. In FIG. 1, the potentiometer 52 and negative temperature coefficient thermistor 54 are in separate legs 38 and 36 and the bridge circuit 14 is designed to regulate a heating source. However, if the thermistor 54 were characterized by a positive temperature coefficient of impedance variation, or as just indicated if the thermistor were located in the leg 36 and the potentiometer in the leg 38, then the bridge circuit would regulate a controlled cooling source. Also, rather than being in separate legs, the potentiometer 52 and thermistor 54 could be connected in the same leg of the bridge circuit—provided a balancing impedance were included in the other of the legs 36 and 38. For example, if the thermistor 54 were included in the leg 36 and possessed a negative temperature coefficient, the bridge circuit 14 would regulate the operation of a controlled cooling source whereas if the thermistor possessed a positive temperature coefficient, the circuit would regulate a controlled heating source. Similarly, if the potentiometer 52 and negative temperature coefficient thermistor 54 were connected in series in the leg 38, the circuit would regulate a controlled heating source whereas if the thermistor were characterized by a positive temperature coefficient, the circuit would regulate a controlled cooling source.

In addition to the flexibility built into the basic circuit arrangement illustrated in FIG. 1, wherein by a simple change in the impedance components and their arrangement, different types of controlled heat sources may be regulated, the basic circuit requires only three leads between the thermostat or temperature sensing portion of the circuit and the power supply and controlled heat source. Generally, the thermostat is located remote from the power supply and controlled heat source. For example, the thermostat may be stationed in the wall of an office building or room of a house and the controlled heat source and power supply located in a central area for a group of offices or in the basement or garage of the home. Therefore, the use of of only three wires reduces the amount and cost of wiring to a minimum. Also, the actual wiring job is extremely simple to quickly and accurately perform.

Figure 3:
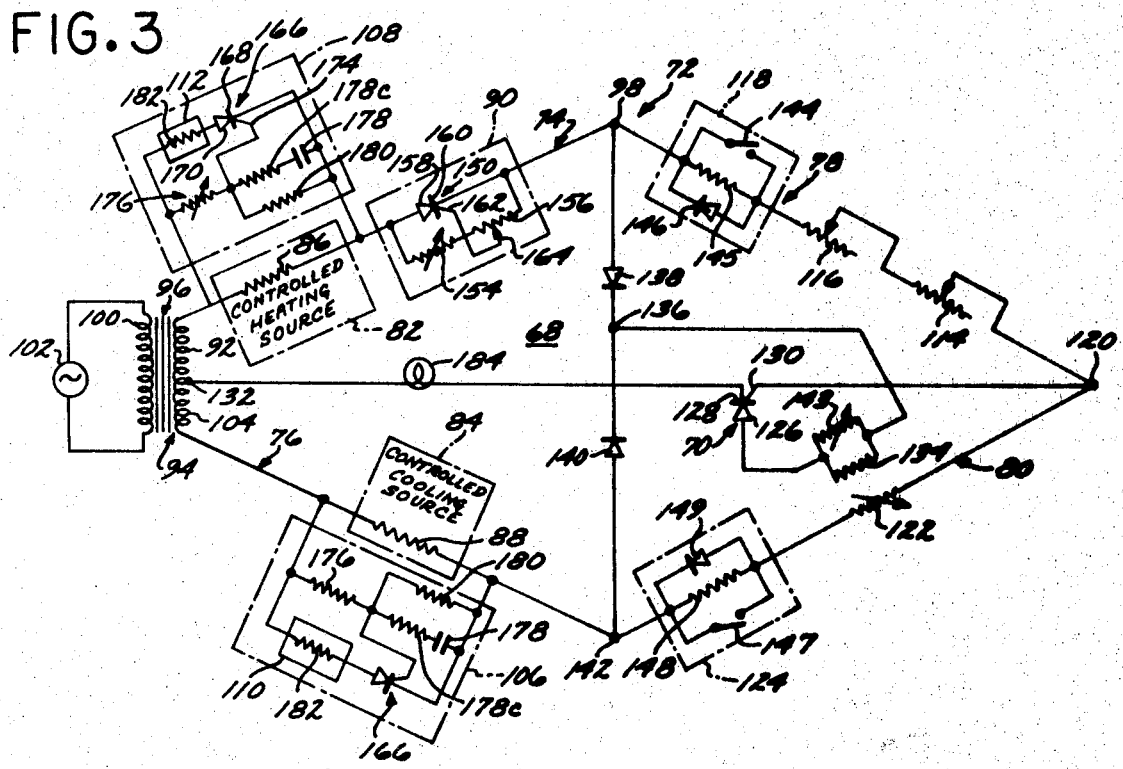
FIG. 3 is a wiring diagram of a preferred form of temperature control system incorporating both controlled heating and cooling sources.

A circuit including all of the foregoing advantages as well as additional capabilities including the capacity to regulate both a controlled heating source and a controlled cooling source is illustrated in FIG. 3 and represented generally by the numeral 68.

As represented, the temperature control circuit 68 includes a controlled rectifier 70 and a bridge circuit 72 having four legs 74, 76, 78 and 80 and including a controlled heating source 82 in the leg 74 and a controlled cooling source in the leg 76. The bridge circuit 72 is temperature sensitive and may be adjusted to substantially balanced conditions at preselected environmental temperatures over a given range of values. With the bridge balanced, the controlled rectifier 70 is nonconductive. However, a change in the environmental temperature from the preselected value unbalances the bridge causing the controlled rectifier 70 to fire or trigger during particular halves of each AC cycle and to, in turn, energize either the controlled heating source 82 or the controlled cooling source 84. The operation of the controlled heating source 82 or controlled cooling source 84 returns the environment to the preselected temperature to again rebalance the bridge circuit 72.

The controlled heating source 82 and controlled cooling source 84 may take various forms and by way of example may be of the type illustrated in FIG. 2, including heating resistors 86 and 88, respectively, to control the operation of an associated heat motor or refrigeration unit.

In addition to the controlled heating source 82, the leg 74 of the bridge 72 includes a high temperature limit control circuit 90 and one-half 92 of a center-tapped secondary winding 94 of a transformer 96. The control circuit 90 is connected to a junction 98 of the legs 74 and 78 and as will be described in detail hereinafter, operates to shut off the controlled heating source 82 were a gas-fired furnace, and air circulation through the heat exchanger of the furnace were prevented by a clogged air filter, the consequent possible overheating would be prevented by the operation of the circuit 90. The circuit 90 would have the effect of shutting off the heating source 82 despite the fact that the remainder of the circuit was calling for heat.

Figure 3A:
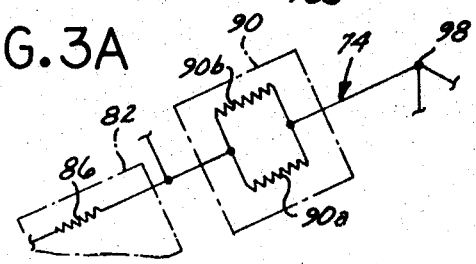
FIG. 3A is a wiring diagram of a modification of the system of FIG. 3 which is effective as a high limit control.

A simpler circuit, which is effective as a high limit control, is shown in FIG. 3A. It consists of a fixed resistor 90a of high resistance compared to the load, but low compared to that of the bridge arms. It is connected in parallel with a switching thermistor 90b of very low resistance value at room temperature compared with the load. The switching point is selected so as to change to a high resistance value at the highest temperature considered "safe," for example, 180° F. At this point, the low resistance path through the thermistor 90b for valve heat motor current is effectively opened and the current through the heat motor valve is reduced to an insignificant amount, only enough to keep the bridge from unbalancing to the point that it would switch on cooling. This also causes a change in gating bias which will switch the thermostat to "off," thus using SCR 70 for both temperature control and for high temperature limiting.

The transformer 96 is preferably a voltage stepdown transformer and includes a primary winding 100 connected in series with an AC source 102, which may be a conventional 110 volt, 60 cycle source. Thus arranged, the source 102 develops equal and in-phase AC voltages across halves 92 and 104 of the secondary winding 94—the half 104 forming part of the leg 76 of the bridge circuit. In fact, the center-tapped secondary winding 94 may be considered as defining two in-phase, AC signal sources in the legs 74 and 76 of the bridge circuit.

In addition to the AC source defined by the half 104 of the secondary winding 94, the leg 76 of the bridge circuit 72 includes the controlled cooling source 84 having a second stage cooling control circuit 106 connected in parallel therewith. A similar control circuit a secondary heating control circuit 108 is connected in parallel with the controlled heating source 82. As will be described in greater detail hereinafter, the second stage cooling and heating control circuits function to provide additional cooling and heating capacity for the temperature control system by providing means for automatically actuating the second stage of the controlled cooling and heating sources when it is desirable to more rapidly cool or heat a given environment.

As in the temperature control circuit 10, the remaining legs 78 and 80 of the bridge circuit 72 may take various forms including different components of different characteristics and different arrangement. In the illustrated form, the leg 78 of the bridge circuit includes a temperature setting potentiometer 114, a calibration potentiometer 116 and a heating function control circuit 118 connected in series between the junction 98 an and a junction 120 and the legs 78 and 80.

The leg 80 includes a temperature sensitive variable impedance device 122, such as a thermistor having a negative temperature coefficient of impedance variation, connected in series with a cooling function control circuit 124.

In the bridge circuit 72, the calibration potentiometer 116 combines with the temperature setting potentiometer 114 to equal the impedance presented by the thermistor 122 and to thereby balance the bridge circuit 72 at a temperature preselected by the setting of the potentiometer 114 in cooperation with the operation of the controlled heating and cooling sources 82 and 84. Under some conditions of operation it is desirable to inhibit operation of either heating or of cooling until some unusually low temperature, such as freezing, or some unusually high temperature is reached. This can be accomplished by use of function control circuits, as will be apparent to those skilled in the art.

The heating and cooling function control circuits 118 and 124 will be described in greater detail hereinafter. Briefly, however, the control circuits each possess closed or low impedance and open or high impedance states and operate to provide means for selectively permitting or inhibiting actuation of the controlled heating and cooling sources despite the temperature in the surrounding environment. For example, with the heating and cooling function control circuits in the closed states, both the controlled heating and cooling sources may operate automatically in response to changes in the environmental temperature surrounding the bridge circuit. When one or the other of the function control circuits is in the open state, however, the the corresponding controlled source is inhibited from operation, despite changes in the environmental temperature which would normally actuate the source by unbalance of the bridge circuit 72.

As in the temperature control circuit 10, the impedance presented by the legs 78 and 80 is significantly larger than the impedance of the though 74 and 76. In fact, when the bridge circuit 72 is balanced, substantially the entire voltages developed in the halves 92 and 104 of the secondary winding 94 appear across the legs 78 and 80, respectively. Likewise, when the bridge is balanced, the alternating current flow in the bridge circuit is very small and insufficient to energize the controlled heating source 82 or the controlled cooling source 84. In fact, but for the inclusion of the controlled rectifier 70, normal unbalance of the bridge circuit 72 would not produce sufficient current flow to actuate either the heating or the cooling sources.

In this regard, in the temperature control circuit 68, the rectifier 70 is a silicon controlled rectifier including an anode 126, a cathode 128 and a control electrode 130. The cathode 128 is connected to the center tap 132 of the secondary winding 94 and the control electrode 130 is connected to the junction 120. The anode 126, however, is connected to a compensating circuit including a heating resistor 134 and to a junction 136 of the cathodes of a pair of diodes 138 and 140. The anode of the diode 138 is connected to the junction 98 and the anode of the diode 140 to a junction 142 of the legs of the bridge circuit 72. Thus arranged, the diodes 138 and 140 combine with the center-tapped secondary winding 94 to provide means for forward biasing the rectifier 70 during alternate halves of each AC cycle. This enables the rectifier 70 to be triggered by firing currents during either the positive or negative-going half cycles of the AC current applied to the bridge circuit 72 and to thereby actuate one or the other of the controlled sources 82 and 84 in a manner similar to that previously described in connection with FIG. 1.

More particularly, when the bridge circuit 72 is balanced and the function control circuits 118 and 124 are closed, the alternating voltage developed across the anode and cathode of the rectifier 70 is insufficient to trigger the rectifier. However, if the temperature in the surrounding environment drops or if the potentiometer 114 is adjusted to reduce the impedance presented by the leg 78, the bridge circuit 72 is unbalanced and the voltage developed across the leg 80 becomes greater than the voltage across the leg 78. During the first positive-going half AC cycle after the unbalance occurs, the voltage at the junction 120 is positive with respect to the voltage of the center tap 132 and current flows into the control electrode 130. As the magnitude of the positive-going AC current increases, the current flowing into the control electrode 130 also increases to a point sufficient to fire the then forwardly biased rectifier 70.

When the rectifier 70 is fired, substantially the entire voltage developed in the half 92 of the secondary winding 94 is applied to the heating resistor 82 in the controlled heating source 82 and the voltage applied to the thermistor 122 drops significantly. As previously indicated in connection with FIG. 1, this produces a very rapid loss in self-heating of the thermistor locking the SCR 70 on heating, causing the heating resistor 86 to rapidly excite the controlled heating source 82 which in turn supplies heat to the surrounding environment to bring the surrounding environment back up to the temperature preselected by the setting of the potentiometer 114. The drop in voltage across the leg 78 of the bridge circuit upsets the bridge balance, however, since the control electrode 130 no longer controls the rectifier 70 for the balance of the forward going half of the AC cycle, the change in leg 78 does not affect circuit operation.

As the end of the positive-going half cycle, the rectifier 70 is no longer forward biased and insufficient current flows into the control electrode to fire the rectifier which then returns to a nonconductive state. Then, during the negative-going half of the AC cycle, the voltage at the junction 120 is negative with respect to the voltage at the center tap 132 and, despite the forward biasing of the rectifier 70 from junction 142, current does not flow into the control electrode 130 and thus does not trigger the rectifier. The operation of the rectifier 70 described immediately above is repeated each cycle until the bridge circuit 72 is again rebalanced.

A similar operation occurs for the controlled cooling source 82 during negative-going halves of each AC cycle when the temperature of the surrounding environment increases or the potentiometer 112 is adjusted to increase the impedance in the leg 78 thereby unbalancing the bridge circuit 72. Under such conditions, the unbalance of the bridge during the positive-going halves of each AC cycle does not produce a current flow into the control electrode 130 to fire the rectifier 70. During the negative-going halves of each AC cycle, however, the voltage at the junction 120 is positive with respect to the voltage at the center tap 132 and current flows into the control electrode 120. As the magnitude of the negative-going current increases, the current into the control electrode likewise increases to a point where the rectifier 70 is triggered or fired. Thereafter, substantially the entire voltage in the half 104 of the secondary winding 94 is developed across the heating resistor 88 in the controlled cooling source and the voltage applied to the thermistor 122 is drastically reduced. As described earlier, thermistor 122 then operates cooler, tending to balance the bridge and shutoff the SCR. Under such conditions, and as previously indicated in connection with FIG. 1, the heating resistor 88 heats relatively slowly to energize the controlled cooling source 84 which in turn cools the surrounding environment to slowly bring the bridge circuit 72 back to a balanced condition.

In both the energizing of the controlled heating source 82 and the controlled cooling source 84, current flows from the associated half of the secondary winding 94 through the parallel circuit including the heating resistor 134 and through the conducting rectifier 70. During the positive-going halves of each AC cycle, that is, when the controlled heating source 82 is operating, the current flowing in the heating resistor 134 slowly heats the resistor to generate heat in the area immediately adjacent the thermistor 122, tending to make up for the previously discussed loss in self-heating. The magnitude of the current flowing in the heating resistor 134 and the amount of heat generated thereby is controlled in part by the value of the resistance presented by the variable resistor 143 connected in parallel with the heating resistor. The heat applied to the thermistor 122 by the heating resistor 134 is in addition to the heat generated by the heating source 82 and aids in the return of the bridge circuit 72 to a balanced condition. In fact, with the resistor 134 the heating resistor can be made to exactly compensate for loss in self-heating at the thermistor or to under or over compensate.

The bridge circuit returns to its balanced condition slightly prior to the time the surrounding environment reaches the temperature selected by the temperature setting potentiometer 114. The inclusion of the heating resistor 134 in the anode circuit of the rectifier 70 and adjacent the thermistor 122 thereby permits adjustment to prevent the controlled heating source 82 from overshooting the desired environmental temperature and improves the overall accuracy of the temperature control system. The inclusion of the heating resistor 134, however, does not prevent the surrounding environment from reaching the desired temperature since the controlled heating source 82 continues to operate for a short period of time after the termination of current flow through the heating resistor 86 to accurately bring the surrounding environment to the preselected temperature.

During the negative-going halves of each AC cycle, that is, when the controlled cooling source 84 is operating, the current flowing in the heating resistor 134 also slowly heats the resistor to generate heat in the area immediately adjacent the thermistor 122. The heat from the resistor 134 in effect tells the thermistor 122 that the room is warm, thus prolonging the cooling cycles by calling for even lower temperatures for shutoff of the cooling system. This heating may be adjusted to exactly compensate for or over compensate for the loss in self-heating of the thermistor.

The foregoing operations of the temperature control circuit 68 have been described with the assumption that the heating and cooling function control circuits 118 and 124 have been in a closed state having no effect upon current flow in the bridge circuit 72. The function control circuits, however, also include an open state wherein they effectively bias the bridge circuit 72 to prevent actuation of either the heating or cooling functions of the temperature control circuit.

To provide such selective control over the operation of the temperature control circuit, the function control circuit 118 includes a parallel circuit consisting of a normally open switch 144, a resistor 145 and a diode 146 while the function control circuit 124 includes a parallel circuit consisting of a normally open switch 147, a resistor 148 and a diode 149.

The function control circuits 118 and 124 are said to be in closed states when the switches 144 and 147 are closed, and in open states when the switches are open. When the heating function control circuit 118 is closed, current flows through the switch 144. Therefore, the closed heating function control circuit 118 presents substantially zero impedance to current flow in the leg 78 and does not alter the previously described operations of the temperature control circuit 68. Similarly, when the cooling function control circuit 124 is closed, current flows through the switch 147. Therefore, the closed cooling function control circuit 124 presents substantially zero impedance to current flow in leg 80 and does not alter the previously described operations of the temperature control circuit.

When the cooling function control circuit 124 is in an open state and the heating function control circuit 118 is in a closed state, however, current cannot flow through the switch 147. Therefore, during the negative-going halves of each AC cycle, current flows through the resistor 148 to unbalance the bridge circuit 72. In particular, during the negative halves of each AC cycle, the impedance of the leg 80 is much greater than the impedance in the leg 78 and the voltage at the junction 120 is much less than the voltage at the junction 132. This means that firing current will not flow into the control electrode 130 and that the rectifier 70 will not fire during negative-going half cycles to actuate the controlled cooling source 84 unless the temperature in the surrounding environment increases to an extremely high value sufficient to cause the impedance of the thermistor 122 to reduce in value to a point where the impedance of the leg 80 is again equal to and less than the impedance of the leg 78. For all practical purposes, this will not occur since by suitable selection of the value of the resistor 148, the temperature at which the bridge circuit 72 will rebalance far exceeds the normal conditions of the surrounding environment. Therefore, when the cooling function control circuit is in the open state, the cooling source 84 is inhibited from operating despite the existence of environmental temperatures which would normally actuate the source.

Despite the open state of the cooling function control circuit 124, during positive-going half cycles, current flows through the closed heating function control circuit 118 and the diode 149, and the bridge circuit 72 remains in a normally functioning condition regulating operation of the controlled heating source 82 in the manner previously described.

Similar inhibiting and control operations occur for the heating and cooling sources 82 and 84, respectively, when the heating function control circuit 118 is in an open state and the cooling function control circuit 124 is in a closed state. In particular, when the heating function control circuit 118 is open, current cannot flow through the switch 144. Therefore, during the positive-going half of each AC cycle, current flows through the resistor 145 of the control circuit 118 and the diode 149 of the control circuit 124. This produces a substantial unbalance of the bridge since during the positive-going half cycles, the impedance in the leg 78 far exceeds the impedance of the leg 80 and the voltage developed across the leg 78 is much greater than the voltage across the leg 80. Because of this, the voltage at the junction 120 is negative with respect to the voltage of the center tap 132 and firing current does not flow into the control electrode 130 and thus does not trigger the rectifier 70. This means that the rectifier 70 will not fire during positive-going half cycles to actuate the controlled heating source 82 unless the temperature in the surrounding environment decreases to an extremely low value sufficient to cause the impedance of the thermistor 122 to increase in value to a point where the impedance of the leg 80 again equals and exceeds the impedance of the leg 78. For all practical purposes, this will not occur since by suitable selection of the value of the resistor 145, the temperature at which the bridge circuit 72 will rebalance is far less than the normal temperature of the surrounding environment. Therefore, when the heating function control circuit 118 is in the open state, the heating source 82 is inhibited form operating despite the existence of environmental temperatures which would normally actuate the source.

Despite the open state of the heating function control circuit 118, during negative-going half cycles, current flows through the closed cooling function control circuit 124 and through the diode 146 of the heating function control circuit. The bridge circuit 72 is therefore in a balanced condition during negative-going half cycles and regulates the operation of the controlled cooling source 84 in the manner previously described. In case it is desired to positively prevent heating or cooling, the switching system shown in FIG. 4, and described later, would be used.

In addition to providing means for selectively controlling the actuation of controlled heating and cooling sources, the temperature control circuit 68 includes the high temperature limit control circuit 90. As previously indicated, the circuit 90 is operative to shutoff the heating source 82 in the event that unduly high temperatures exist at the source, as would be the case if the heating source were a gas-fired furnace and the air circulation through the heat exchanger of the furnace were prevented by a clogged filter or the like. In such eventuality, the circuit 90 would shutoff the heating source 82 and prevent development of dangerous temperatures and possible fire in the furnace area. To accomplish this, the control circuit 90 includes a controlled rectifier 150, a positive temperature coefficient thermistor 154 located in the area of potentially high furnace operating temperature, for example, and a variable resistor or potentiometer 156. The anode 158 of the controlled rectifier is connected to the heating resistor 86 in the controlled heating source 82 while the cathode 160 of the rectifier is connected to the junction 98 in the bridge circuit 72. The control electrode 162 of the rectifier is connected to the movable arm 164 of the potentiometer 156 which in turn is connected in series with the thermistor 154, the series combination being connected between the cathode and anode of the rectifier 150. The current flowing during the negative-going halves of each AC cycles, and which controls cooling, will be passed by resistors 164 and 145 without substantially altering bridge balance.

During the positive-going half cycles, current flows from the transformer 96 through the controlled heating source 82 and into the high temperature limit control circuit 90. Current in the control circuit 90 flows through the thermistor 154 and into the control electrode 162 of the then forwardly biased rectifier 150. The current flow into the control electrode 162 is sufficient to trigger the controlled rectifier 150 which then acts as a short circuit passing current to the junction 98 for the balance of the positive-going half cycle.

Another method of adding the high limit function consists of using a switching thermistor in series with the load 86, said switching thermistor, being located in the top furnace area, so as to sense overheat, and to change to a very high resistance under this condition. In order that this high limit control shall not unbalance the bridge enough to cause air conditioning to come on, the thermistor is bypassed with a resistor, which is high in resistance as compared with heat motor 86, but low compared with bridge arms 78 and 80. Operation of this circuit will serve not only to reduce current available to circuit 86, while the SCR 70 is conductive, even to the point of permitting valve closure, but it will also shift the balance of junction 120 in such direction as to reduce gating current available to SCR 70 to below that required for firing. The switching thermistor thus, first "starves" the heat, then shuts it off.

The foregoing operation is repeated for each positive-going half cycle for which sufficient current flows into the control electrode 162. Under normal heating conditions, the impedance presented by the thermistor 154 is of a low value and the rectifier 150 fires during each positive-going half cycle. However, should the temperature of the environment around the heating source 82 become dangerously high, presenting a fire hazard, the impedance presented by the thermistor 154 likewise will exceed a predetermined value. As the impedance presented by the thermistor 154 increases, the current flowing therethrough and into the control electrode 162 decreases. At the predetermined value of impedance, insufficient current flows into the control electrode 162 to trigger the rectifier 150 during positive-going half cycles. At the same time, the thermistor and potentiometer 156 present a high impedance to current flow, reducing the value of the current flowing in the leg 74 and hence the heat generated by the heating resistor 86. In this manner, the high temperature limit control circuit 90 prevents undesired and dangerous overheating of the heating source 82.

An additional feature of the temperature control circuit 68 is its capability of automatically adding heating and/or cooling capacity to the associated temperature control system whereby the system may heat or cool the surrounding environment at different rates. The means for implementing this feature comprises the second stage heating and cooling control circuits 108 and 106. The circuitry of the control circuits 106 and 108 is the same. Therefore, like reference numerals are employed for both control circuits and only the heating control circuit 108 will be described in detail herein.

The second stage heating control circuit 108 includes a controlled rectifier 166 having its cathode 168 connected to a junction of the controlled heating source 82 and the high temperature limit control circuit 90, and its anode 170 connected through the second stage heat motor 112 to a junction of the secondary winding 94 and the first stage controlled heating source. The control electrode 174 of the rectifier 166 is connected to a junction common to a variable resistor 176, a resistor 178 c-capacitor 178 combination and a resistor 180- —the resistor 176, in turn, being connected between that junction and the junction of resistor 86, winding 94 and resistor 182, in parallel to the cathode of the controlled rectifier 166.

Connected in series with the anode 170 of the controlled rectifier 166 is the controlled heating source 112, which may be the second stage of the controlled heating source 82, or may be a separate heating source which is responsive to current flowing through the conductive rectifier 166 to energize heating means for adding additional heat to the surrounding environment. By way of illustration and example, the controlled heating source 112 includes a heating resistor 182 and may be of the type illustrated in FIG. 2.

With the inclusion of the second stage heating control circuit 108 in the temperature control system, the system has a dual heating capacity, namely, that provided by the controlled heating source 82 and that provided by the source 112. In the illustrated form of the temperature control circuit 68, the heating sources 82 and 108 are arranged such that when it is desired to rapidly heat the surrounding environment to approach a given temperature, both sources may be energized. Thereafter, when the temperature in the environment is close to the preselected value, only the controlled heating source 82 is energized. This maintains closer temperature control, better air circulation and conserves on electrical power and fuel which otherwise might be expended if both sources were always energized to control the environmental temperature. Similar savings of fuel and electricity are achieved by employing the second stage cooling control circuit 104 in combination with the controlled cooling source 84.

In the second stage heating control circuit 108, the second stage heating control circuit is only energized during positive-going half cycles. During the positive-going halves of each AC cycle, the rectifier 166 is forward biased. Initially, however, current flows through the variable resistor 176, thus charging the capacitor 178. This is not sufficient to build enough current in gate 174 to cause rectifier 166 to become conductive. As the magnitude of the current increases during the positive-going half cycle, due to the increased conduction time of the SCR 70, the capacitor 178 charges more rapidly and causes an increase in voltage at the junction of resistors 176 and 180. Increased current then flows into the control electrode 174 of the rectifier 166. When the current flow into the control electrode 174 reaches a predetermined value, the rectifier 166 is fired and during the balance of the positive-going half cycle current flows through the heating resistor 182 in the controlled heating source 112 and through the conductive rectifier 166 to energize the source 112 which adds heat to the surrounding environment. The value of the resistors 180 and 178c determines the rate of charge of the capacitor 178 for a given current flow through the resistor 176. Resistor 178c determines the discharge rate of capacitor 178.

By suitable adjustment of the variable resistor 176, the second stage heating control circuit 108 is regulated such that sufficient current flows into the control electrode 174 only if current flows through the controlled heating source 82 for longer than a predetermined portion of a positive-going half cycle. That is, the second stage heating control circuit 108 is energized to operate the source 112 only when the rectifier 70 is fired prior to a predetermined time during a positive-going half cycle.

Such a condition is controlled by the degree of unbalance in the bridge circuit 72. Thus, for example, when the surrounding area is far below the set temperature, the temperature control circuit 68 automatically increases the value of the impedance presented by the thermistor 122 by more than a predetermined amounts. The bridge circuit 72 then is unbalanced to a degree that the current flowing in the control electrode 130 reaches a value sufficient to fire the rectifier 70 early in the positive-going half of an AC cycle. Due to the early firing of the rectifier 70, increased average current flows through the controlled heating source 82 to excite the source. Increased currents also flow through the resistor 176 in the second stage heating control circuit 108. Because the rectifier 70 is fired relatively early in the positive-going half cycle, the increased current has time to charge the capacitor 178 causing increased current to flow to the control electrode 174 sufficient to fire the rectifier 166. When this occurs, the heating source 112 is energized to provide additional heating capacity for the temperature control system.

Accordingly, with the second stage heating control circuit 108, the heating control system utilizing the circuit 68 is capable of heating a given environment at different rates depending upon the degree of unbalance imparted to the bridge circuit 72 by the difference between actual temperature and the setting of potentiometer 114. Thus, the temperature control system can be controlled to rapidly heat a given area by calling upon the maximum heating capacity of the system. Thereafter, only the controlled heat source 82 need by utilized to maintain the environment at the desired temperature.

A similar arrangement is provided by the inclusion of a second stage cooling control circuit 106 in the temperature control system. Thus, the surrounding environment may be rapidly cooled by calling upon a maximum cooling capacity provided by the source 84 and the source 110. Thereafter, the controlled cooling source 84 may be utilized exclusively to maintain the environment at the desired cool temperature.

A lamp 184 is connected between the cathode 128 and the center tap 132 of the secondary winding 94. The purpose of the lamp 184 in the cathode-center tap circuit is to limit the level of power in the circuit to prevent overheating of the circuit wiring and of the components in the present control system. That is, the lamp 184 constitutes a variable impedance having a positive temperature coefficient of impedance to dissipate excess energy. In some cases, it may be desired to utilize the center conductor connecting 132 and 128 for currents other than the thermostat current; for example, when a fan switch is supplied at the thermostat. In these cases the lamp "-ballast" may be located in the controlled heating source 86, or in the controlled cooling source 84.

Figure 4:
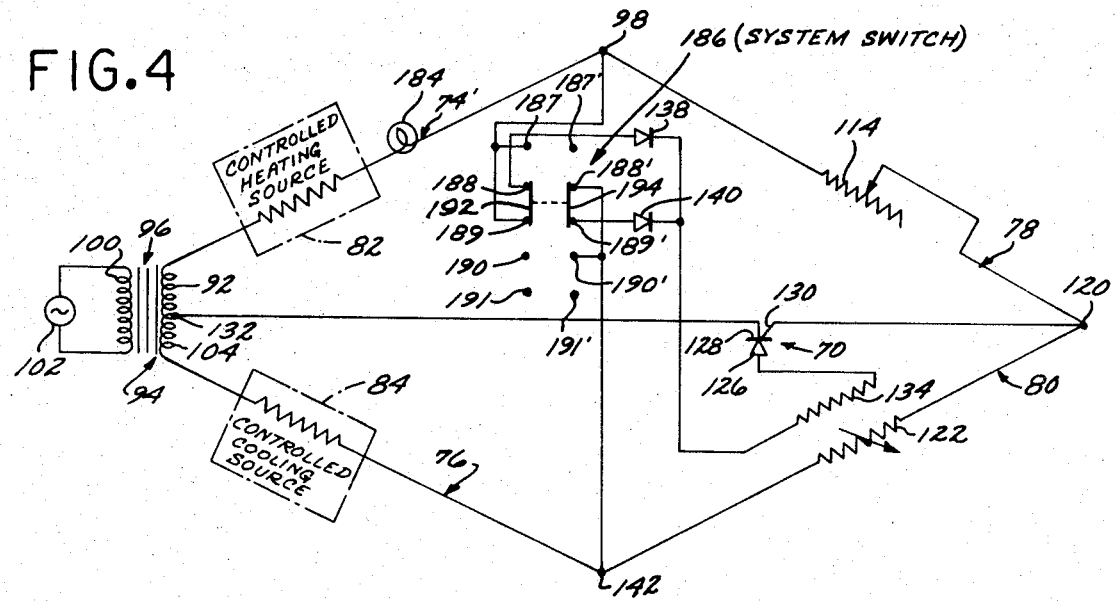
FIG. 4 is a wiring diagram of a temperature control system incorporating both controlled heating and cooling sources and a system switch for manually switching between heating and cooling as well as automatic operation.

In the form of the temperature control circuit illustrated in FIG. 3, function control circuits 118 and 124 are included to provide for either heating, cooling or automatic operation of the circuit. In cases where full and positive turn-off is desired, an alternate form of circuit including a system switch 186 in place of the function circuits 118 and 124 is illustrated in FIG. 4. The balance of the circuitry is similar to that illustrated in FIG. 3. Accordingly, corresponding elements of FIG. 4 are denoted by the same reference numerals as employed in FIG. 3 and a detailed explanation of their functions will not be repeated.

Generally speaking, the system switch 186 functions to connect the anode 126 of the rectifier 70 to the junction 98 or to the junction 142 or to both the junctions 98 and 142 depending upon whether it is desired to operate the circuit under heating only, cooling only, or automatic operation, respectively. That is, by the system switch 186, the anode 126 may be connected to the junction 98 only such that the rectifier 70 is forward biased only during positive-going halves of each AC cycle to permit operation of the heating source 82 only. Alternatively, the system switch 186 may connect the anode 126 to the junction 142 such that the rectifier 70 is only forward biased during negative-going halves of each AC cycle to permit operation of the cooling source 84 only. Still further, when the system switch 186 may connect the anode 126 of the rectifier 70 to both the junctions 98 and 142, to permit the rectifier 70 to be forward biased both during the positive and negative-going halves of each AC cycle to provide for automatic operation of the circuit and heating and cooling sources.

To accomplish the foregoing, the system switch 186 includes five pairs of contacts 187, 187' through 191, 191' and a pair of slider arms 192 and 194 physically connected to move together between the pairs of contacts. The contacts 187 and 189 are connected to the junction 98 while the contacts 188 and 189' are connected to the anodes of the diodes 138 and 140, respectively. The contacts 188' and 190' are connected to the junction 142.

Thus arranged, the pairs of contacts 187, 187' and 188, 188' define a heating only position for the system switch. That is, when the arms 192 and 194 close the contacts 187, 188 and 187', 188', the system switch 186 connects the rectifier 70 to the junction 98 to permit the system to only provide operation of the controlled heating source 82.

Similarly, the pairs of contacts 188, 189 and 188', 189', define an automatic position for the system switch 186 wherein the slide arms 192 and 194 connect the rectifier 70 to both the junctions 98 and 142. In such a position, the system switch 186 permits the rectifier 70 to be forward biased during both positive and negative-going halves of each AC cycle to permit operation of both the controlled heating source 82 and controlled cooling source 84 depending upon the temperature in the surrounding environment.

Further, the contacts 189, 190 and 189', 190' define a cooling only position for the system switch in which the rectifier 70 is connected through the arms 192 and 194 only to the junction 142 to permit operation of the controlled cooling source 84 only.

Still further, the contacts 190, 191 and 190', 191', define an off position for the system switch 186 in which the circuit is inactivated.

As previously indicated, one of the shortcoming of prior temperature control circuits for providing both heating and cooling operation is the fact that in switching between heating and cooling conditions the circuits do not immediately begin to heat or cool the surrounding area. In fact, when the circuits are switched from heating to cooling operation, the temperatures of the surrounding areas must first rise a few degrees above that established by the heating operation or the circuits must be physically adjusted to call for cooling at lower temperatures. Conversely, when the circuits are switched from cooling to heating operation, the temperatures of the surrounding areas must drop a few degrees below that established by the cooling operation or the circuits must be adjusted to call for heating at higher temperatures. Accordingly, in conventional systems for both heating and cooling, there is a built-in "dead band" over which the system will not immediately function in switching between the heating and cooling operation.

Figure 5:
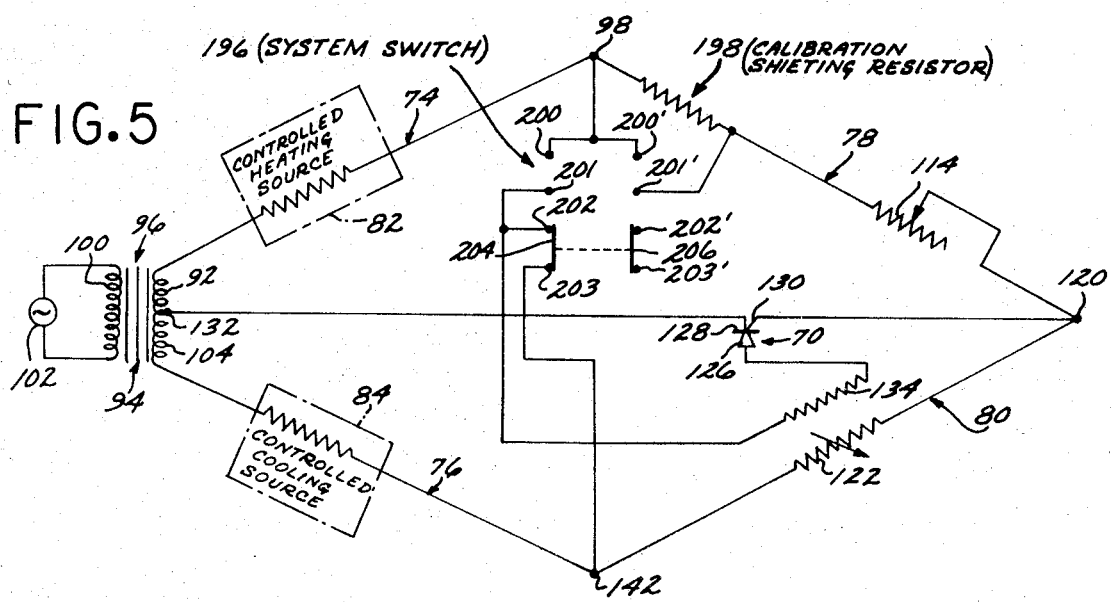
FIG. 5 is a wiring diagram of a temperature control system incorporating both controlled heating and cooling sources as well as means causing the sources to operate to the same temperature when the system is switched between heating and cooling operation.
Figure 5A:
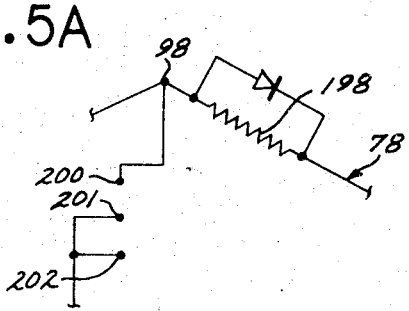
FIG. 5A is a wiring diagram of a modification of the system of FIG. 5 which functions as an automatically switched calibration shifting resistor.

The circuitry illustrated in FIG. 5 eliminates the "dead band" in a temperature control circuit for both heating or cooling a given area. The circuitry of FIG. 5 is very similar to that previously described in connection with FIG. 3. Accordingly, like components are designated by the same reference numerals as in FIG. 3 and a detailed discussion of their operation will not be repeated.

The main differences between the system illustrated in FIG. 5 and that disclosed in FIG. 3 is the inclusion of a system switch 196 and a calibration shifting resistor 198 in the circuitry of FIG. 5. The calibration shifting resistor 198 is included in the leg 78 of the bridge circuit in series with the potentiometer 114 and is connected to the junction 98, and is useable as shown for manual changeover. If it is desired to use calibration shifting to eliminate the dead band with automatic changeover, the short circuiting of the calibration shifting resistor is accomplished with a by passing diode poled to allow current flow in the direction permitting heating but blocking current flow in the reverse direction.

Generally speaking, the systems switch 196 is designed to selectively connect the anode 126 of the rectifier 70 to either the junction 98 or the junction 142 of the bridge circuit and to thereby condition the circuit for either heating only or cooling only operation. In addition, the system switch 196 is designed to short circuit the calibration shifting resistor 198 when in a heating only condition. The system switch also provides an "off" condition for the system wherein the system will provide neither heating nor cooling operation.

To accomplish the foregoing, the system switch 196 includes four pairs of contacts 200, 200' through 203, 203' and two slide arms 204 and 206 physically connected to move together between the pairs of contacts. The contacts 200 and 200' are connected to the junction 98 while the contact 203 is connected to the junction 142. The contacts 201 and 202 are connected to the anode 126 of the rectifier 70 while the contact 201' is connected to a junction of the calibration shifting resistor 198 and the potentiometer 114 in the leg 78 of the bridge circuit.

Thus arranged, the pairs of contacts 200 and 200' and 201, 201' define a heating only position for the system switch 196. That is, when the arms 204 and 206 close the contacts 200, 201 and 200', 201', the anode of the rectifier 70 is connected only to the junction 98 to only permit operation of the heading source 82. Also, in the heating only position, the calibrating shifting resistor 198 is short circuited by the connection of the arm 206 to the contacts 200' and 201'. Accordingly, the calibration shifting resistor 198 does not enter into the operation of the bridge circuit when the system switch is in the heating only position and the bridge circuit functions in the manner previously described to control the heating source 82 in response to a reduction in the temperature of the surrounding environment below that established by the potentiometer 114.

Similarly, the pairs of contacts 202, 203 and 202', 203', define a cooling only position for the system switch. That is, when the slide arms 204 and 206 close the contacts 202, 203, and 202', 203' the anode 126 of the rectifier 70 is connected only to the junction 142 to only permit operation of the controlled cooling source 84.

Further, the pairs of contacts 201, 202 and 201', 202' define an "off" position for the system switch 196 in which the rectifier 70 is not connected to either junction 98 or 142.

When the system switch 196 is in the cooling only position, the calibration shifting resistor 198 comprises and integral part of the leg 78 of the bridge circuit. The inclusion of the calibration shifting resistor functions to shift the voltage at the junction 120 and hence the value of the current flowing into the control electrode 130 of the rectifier 70 to a value such that any further unbalance of the bridge circuit caused by an increase in the temperature of the surrounding environment produces an immediate firing of the rectifier during the negative-going half of the AC cycle to activate the cooling source 84. Conversely, when the calibration shifting resistor 198 is short circuited by the system switch 196, the voltage at the junction 120 and the current flowing to the control electrode 130 assume values such that any further unbalance of the bridge circuit caused by a decrease in the temperature of the surrounding environment produces an immediate firing of the rectifier during the positive-going half of the AC cycle to activate the heating source 82.

In the foregoing manner, the addition and deletion of the calibration shifting resistor 198 by the system switch 196 automatically shifts the voltage at the junction 120 and the current applied to the control electrode 130 to values above which the forwardly biased rectifier 70 will immediately fire. The addition of the calibration shifting resistor thereby eliminates the "dead band" which would otherwise be associated with temperature control circuit.

Figure 6:
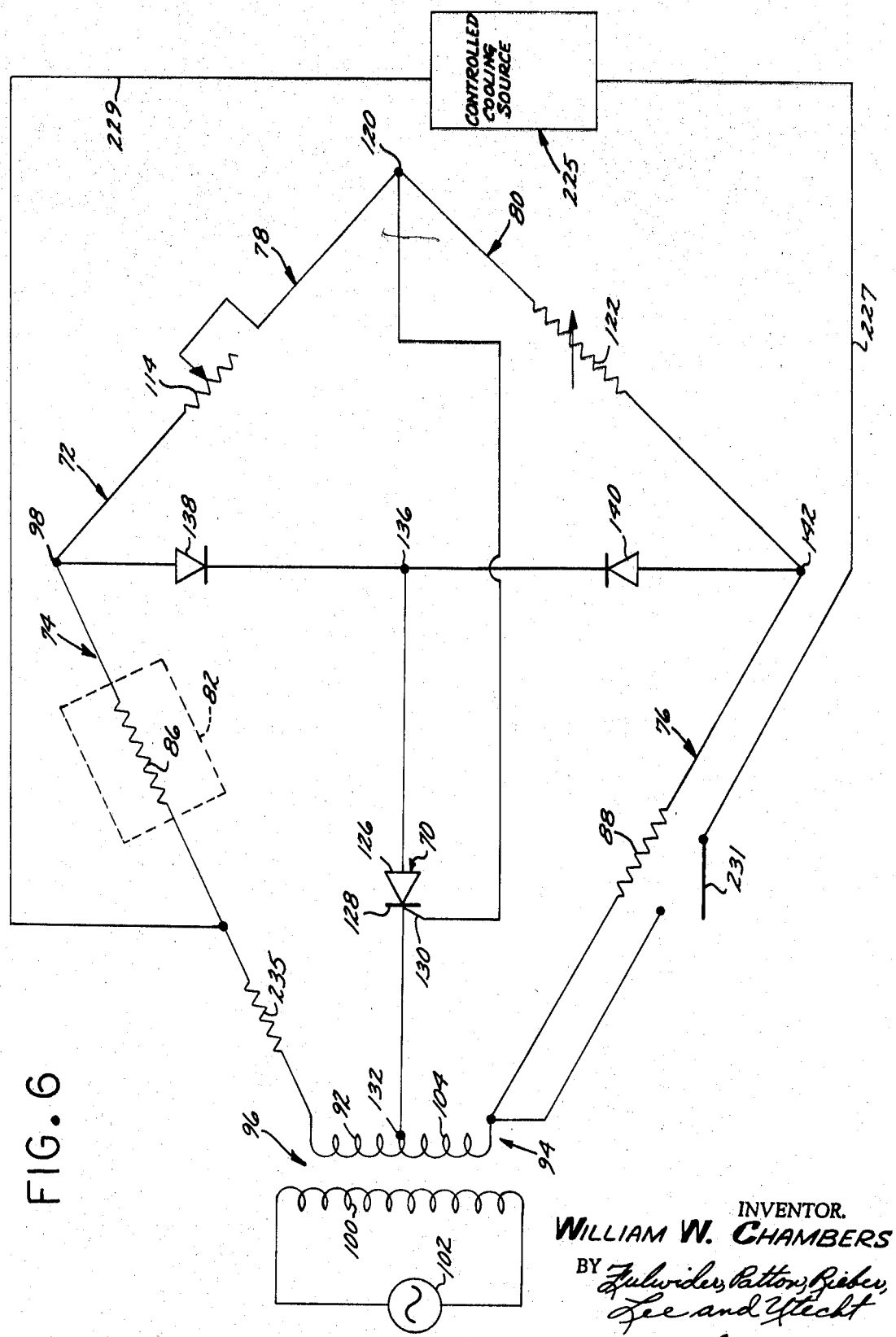
FIG. 6 is a wiring diagram of a temperature control system connected in parallel with a cooling source, and including a compensating resistor to increase the degree of bridge unbalance when said cooling source is energized.

The temperature control system shown in FIG. 6 is similar to those described above in connection with FIG. 3 and, accordingly, like components are designated by like reference numerals and will not be described in detail.

The temperature control system shown in FIG. 6 includes a controlled cooling source 225 connected across the secondary winding 94 of the transformer 96 by means of leads 227 and 229 whereby such source is in parallel with the bridge leg 76. The lead 227 includes a thermostatic switch 231 disposed in heat exchange relationship with the heating resistor 88. Included in the leg 74 of the bridge 72 to compensate for the voltage drop across the secondary winding 94 by closing of the cooling switch 231, is a compensating resistor 235 which possesses sufficient resistance to maintain the cathode-electrode voltage sufficient immediately after closure of the switch 231 to maintain the rectifier 70 triggered and the resistance heater 88 energized.

From the foregoing, it will be clear that when the thermistor 122 becomes sufficiently heated to unbalance the bridge 72 and trigger the rectifier 70, current flow will commence through the rectifier 70 and through the resistor 88 to heat the thermostatic switch 231 and energize the controlled cooling source 225. Closure of the switch 231 will reduce the voltage across the secondary winding 94 and, without the compensating resistor 235 would normally reduce the voltage between the center tap 132 and the juncture 120 below the triggering level of the rectifier 70 to thereby reduce the cathode-electrode voltage below the triggering level and immediately deenergize the resistor 88. However, with the resistor 235 in series between the winding 94 and the juncture 120, the cathode-electrode voltage will remain above the triggering level of the rectifier 70 to continue heating of the resistor 88 thereby avoiding premature opening of the switch 231.

From the forgoing, it is appreciated that the present invention provides a temperature control circuit and system which is relatively simple, including but three leads to connect the temperature sensing portion to the controlled heat source and power supply of the system. The circuit is therefore easy to quickly and accurately install. Also, the circuit is relatively inexpensive to manufacture and maintain.

The basic form of the temperature control circuit also has the advantage of being useful to control a heating source or a cooling source, or both, as desired. More sophisticated forms of the present invention include means for preventing overheating in the heating source area, and for preventing damage to the circuitry, components and wiring which actuates the controlled heat source. Such forms of the invention further provide means whereby the system utilizing the circuitry possesses different heating and/or cooling capacities which may be called upon at will be an operator, or automatically to heat or cool a given environment at different rates. In addition, the heating and cooling sources may be controlled either separately or automatically in combination and in a manner wherein the "dead band" of operation is substantially eliminated.

While particular forms of the temperature control circuit and system have been described in some detail herein, changes and modifications may occur to those skilled in the art without departing from the spirit of the invention. It is therefore intended that the present invention be limited in scope only by the terms of the following claims, it being noted that the phrase "environmental temperature change apparatus" is to be construed sufficiently broadly to include, without limitation, various forms of heating apparatus, cooling apparatus, or combinations of both.

I claim:
1. A temperature control system, comprising:
a controlled rectifier having an anode, a cathode, and a control electrode for receiving a firing current to trigger said rectifier when forward biased;
an AC source connected to said anode and cathode of said rectifier for periodically forward biasing said rectifier;
first circuit means in series with said source for energizing a first stage environmental temperature change apparatus when said rectifier is conducting;
second circuit means connected to said source for sensing surrounding environmental temperature and for applying said firing current to said control electrode to trigger said rectifier when said environmental temperature changes from a preselected value and said rectifier is forward biased; and
third circuit means in circuit with said first circuit means for energizing a second stage environmental temperature change apparatus when said rectifier is conducting current in excess of a predetermined level and duration.

2. A temperature control system comprising:
a substantially balanced four leg AC bridge circuit including first and second in-phase AC sources in first and second legs of said bridge circuit; first circuit means in said first leg for energizing an environmental temperature change apparatus to change the temperature of a given environmental surrounding; a temperature-sensitive impedance means in one of third and fourth legs of said bridge circuit for changing in value in response to changes in the environmental temperature, and a variable impedance means in one of said third and fourth legs of said bridge circuit for preselecting the environmental temperature at which said bridge circuit is balanced; and
a controlled rectifier having an anode connected to a junction of said first and third legs, a cathode connected to a junction of said first and second legs, and a control electrode connected to a junction of said third and fourth legs, whereby said AC sources alternatively bias said rectifier in forward and reverse directions, current is applied to said control electrode sufficient to cause said rectifier to become conductive when said environmental temperature changes from said preselected value to unbalance said bridge circuit and said rectifier is forward biased and whereby said temperature change apparatus is then energized to alter said environmental temperature to rebalance said bridge circuit.

3. The temperature control system of claim 2 wherein said temperature change apparatus is a controlled heating source and wherein said first leg of said bridge circuit includes second circuit means for blocking the current to said controlled heating source upon attainment of a predetermined temperature of said heating source.

4. The temperature of control system of claim 2 wherein the cathode circuit of said rectifier includes variable impedance means having a positive temperature coefficient of impedance to dissipate excess energy applied to said first circuit means.

5. The temperature control system of claim 3 wherein said second circuit means includes a second controlled rectifier in series with said first circuit means and poled for series current flow with said first-mentioned controlled rectifier, variable impedance means having a positive temperature coefficient of impedance connected between the control electrode and anode of said second controlled rectifier, and an impedance connected from the control electrode to the cathode of said second controlled rectifier.

6. The temperature control system of claim 2 including second circuit means in circuit with said first circuit means for energizing a controllable heat means when current to said second circuit means exceeds a predetermined value.

7. The temperature control system of claim 6 wherein said second circuit means includes a second controlled rectifier in series with means for energizing said controlled heat means and in parallel with said first circuit means, said second controlled rectifier being poled for series current flow with said first-mentioned controlled rectifier, and a series-parallel network including capacitor means in impedance means connected in parallel and in series with variable impedance means, the junction between said variable impedance means and said series connected capacitor means and impedance means being connected to the control electrode of said second controlled rectifier, and said series-parallel network being connected in parallel with said first circuit means.

8. The temperature control system of claim 2 wherein said temperature change apparatus is a controlled heating source and wherein said temperature sensitive impedance means is in said fourth leg of said bridge and possesses a negative temperature coefficient of impedance variation.

9. The temperature control system of claim 2 wherein one of said first and second legs includes variable impedance means having a positive temperature coefficient to dissipate excess energy applied to said first circuit means.

10. A temperature control system as set forth in claim 2 wherein said environmental change apparatus is connected in parallel with said first and second legs of said bridge and wherein said bridge circuit includes a compensating resistor in series with said temperature change apparatus for cooperating with said bridge circuit to maintain said bridge circuit sufficiently unbalanced when said temperature change apparatus is actuated to trigger said rectifier each half cycle until said environmental temperature is returned to said preselected value.

11. A temperature control system for controlling both heating and cooling sources, comprising:
a controlled rectifier including an anode, a cathode and a control electrode, said rectifier having a conductive state determined by current flow in said control electrode and forward bias across said anode and cathode;
and a source of alternating current;
first circuit means connected to said source and said anode and cathode for forward biasing said anode and cathode an alternate halves of each cycle;
second circuit means connected to said control electrode for supplying a firing current thereto during one-half of each cycle when the temperature in a given environment is lower than a preselected value and during the other half of each cycle when the environmental temperature is greater than the preselected value;
third circuit means connected in circuit with said anode and cathode for energizing an environmental heating source when said rectifier is conductive on said one-half cycle and for energizing an environmental cooling source when said rectifier is conductive on said other half cycle;
and fourth circuit means in circuit with said second circuit means for selectively inhibiting the supply of firing current to said control electrode even through the environmental temperature is higher or lower than said preselected value.

12. A temperature control system for controlling both heating and cooling sources, comprising:

a controlled rectifier comprising an anode, a cathode and a control electrode, said rectifier having a conductive state determined by current flow in said control electrode and forward bias across said anode and cathode;
a normally, substantially balanced AC bridge means including a temperature-sensitive impedance variable with changes in the surrounding environmental temperature, and a variable impedance for preselecting the environmental temperature at which said bridge is substantially balanced;
means connecting said anode and cathode to said bridge for forward biasing said rectifier during alternate halves of each half AC cycle;
means connecting said control electrode to said bridge for applying a firing current to said control electrode during one-half of each cycle when the environmental temperature is lower than said preselected temperature and during the other half of each cycle when the environmental temperature is greater than the preselected temperature to unbalance said bridge;
means in said bridge for energizing an environmental heating source when said rectifier is fired on said one-half cycle and for energizing an environmental cooling source when said rectifier is fired on said other half cycle; and
means in said bridge for selectively inhibiting the supply of firing current to said control electrode during said one-half cycle and said other half cycle even though the environmental temperature is lower or higher than said preselected temperature.

13. The temperature control system of claim 12 wherein:
said bridge is a four leg bridge including first and second in-phase AC sources in first and second legs of bridge;
said means for energizing said heating source is in said first leg;
said means for energizing said cooling source is in said second leg;
said temperature-sensitive impedance is in one of third and fourth legs on said bridge;
said variable impedance is in one of said third and fourth legs of said bridge;
said control electrode is connected to a junction of said third and fourth legs;
said means connecting said anode and cathode to said bridge include diodes having anodes connected to junctions of said first and third and of said second and fourth legs and cathodes connected to said anode of said controlled rectifier; and
wherein said means for inhibiting said firing current includes parallel circuits in said third and fourth legs each comprising a diode, a resistor, and a switch.

14. A temperature control system as set forth in claim 12 wherein said cooling source is connected to one leg of said bridge and in parallel with said cathode, and wherein said bridge includes a compensating resistor in series with said cooling source for cooperating with said bridge to maintain said bridge circuit unbalance when said cooling source is actuated to continue triggering of said rectifier until said environmental temperature is lowered to said preselected value.

15. A temperature control system for controlling both heating and cooling sources, comprising:
a substantially balanced four leg AC bridge circuit including first and second in-phase AC sources in first and second legs of said bridge, first circuit means in said first leg for energizing a controlled heating source and second circuit means in said second leg for energizing a controlled cooling source, a variable impedance means in one of said third and fourth legs of said bridge for preselecting the environmental temperature at which said bridge is balanced, and a temperature sensitive impedance means in said forth leg of said bridge circuit and possessing a negative temperature coefficient of impedance variation;
a controlled rectifier comprising an anode, a cathode and a control electrode, said rectifier having a conductive state determined by current flow in said control electrode and forward bias across said anode and cathode;

means connecting said control electrode to a junction of said third and fourth legs of said bridge circuit;

means connecting said cathode to a junction of said first and second legs of said bridge circuit; and diode means connected to junctions of said first and third and second and fourth legs of said bridge circuit and to said anode of said controlled rectifier for forward biasing said rectifier during alternate halves of each half AC cycle.

16. A temperature control system for controlling both heating and cooling sources, comprising:

a substantially balanced four leg AC bridge circuit including first and second in-phase AC sources in first and second legs of said bridge, first circuit means in said first leg for energizing a controlled heating source, second circuit means in said second leg for energizing a controlled cooling source, a temperature sensitive impedance means in one of said third and fourth legs of said bridge for changing in value in response to temperature changes in the surrounding environment, and a variable impedance means in one of said third and fourth legs of said bridge for preselecting the environmental temperature at which said bridge is balanced;

a controlled rectifier having an anode, a cathode, and a control electrode, said rectifier having a conductive state determined by current flow in said control electrode and forward bias across said anode and cathode;

means connecting said cathode to a junction of said first and second legs;

means connecting said control electrode to a junction of said third and fourth legs;

first and second diodes having their cathodes connected to said anode of said controlled rectifier; and switch means for selectively connecting said first and second diodes and hence said anode of said controlled rectifier to a junction of said first and third legs, to a junction of said second and fourth legs, and simultaneously to said junctions of said first and third legs and second and third legs.

17. A temperature control system for controlling both heating and cooling sources, comprising:

a substantially balanced four leg AC bridge circuit including first and second in-phase AC sources in first and second legs of said bridge, first circuit means in said first leg for energizing a controlled heating source, second circuit means in said second leg for energizing a control cooling source, a temperature sensitive impedance means in one of third and fourth legs of said bridge for changing in value in response to temperature changes in the surrounding environment, a calibration shifting resistor in said one of said third and fourth legs including said temperature sensitive impedance means, and a variable impedance means in one of said third and fourth legs of said bridge for preselecting the environmental temperature at which said bridge is balanced;

a controlled rectifier comprising an anode, a cathode, and a control electrode, said rectifier having a conductive state determined by current flow in said control electrode and forward bias across said anode and cathode;

means for connecting said cathode to a junction of said first and second legs;

means for connecting said control electrode to a junction of said third and fourth legs; and switch means for selectively connecting said anode to a junction of said first and third legs in one position, for selectively connecting said anode to a junction of said second and fourth legs in a second position and for short circuiting said calibration shifting resistor in one of said positions.

18. The temperature control system of claim 17 wherein said calibration shifting resistor is connected in parallel with a diode poled to allow current flow in the direction permitting heating and to block current flow in the opposite direction, whereby said calibration shifting resistor can be automatically accomplished by said diode instead of said switch means.

19. A temperature control system comprising:

an AC power source;

a controlled heat source connected with said power source;

a bridge circuit connected with said power source for controlling said heat source, said bridge circuit including a controlled rectifier having an anode, a cathode and an electrode for receiving a firing current to trigger said rectifier, said bridge further including circuit means for energizing said heat source when said rectifier is conducting, second circuit means for sensing the environmental temperature and for applying said firing current to said control electrode to trigger said rectifier when said environmental temperature changes from a preselected value, and a compensating resistor in series with said heat source for maintaining said bridge unbalanced and said triggering current imposed on said electrode after actuation of said heat source and until said environmental temperature returns to said preselected value.

FO-1050
(5/69)

UNITED STATES PATENT OFFICE
CERTIFICATE OF CORRECTION

Patent No. _____3,557,342_____     Dated_____January 19, 1971_____

Inventor(s)_____William W. Chambers_____

It is certified that error appears in the above-identified patent and that said Letters Patent are hereby corrected as shown below:

Column 7, line 62, after "82" insert --in the event of overheating thereof. For example, if the source 82--.
Column 9, line 3, delete "though" and insert --legs--.
Column 13, line 19, delete "valve" and insert --value--.
Column 16, line 55, delete "heading" and insert --heating--.
Column 19, line 54, delete "an" and insert --on--.

Signed and sealed this 8th day of June 1971.

(SEAL)
Attest:

EDWARD M. FLETCHER, JR.       WILLIAM E. SCHUYLER, JR.
Attesting Officer              Commissioner of Patents